Feb. 2, 1971    R. C. LITTLE    3,559,302
EDUCATIONAL GAME DEVICE TO IMPROVE TYPING SKILL
Filed July 18, 1968    2 Sheets-Sheet 2
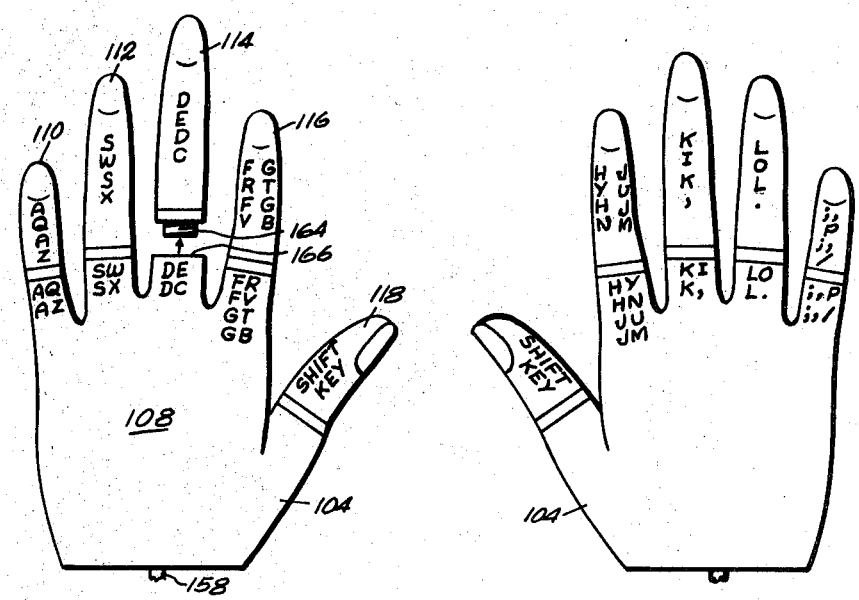
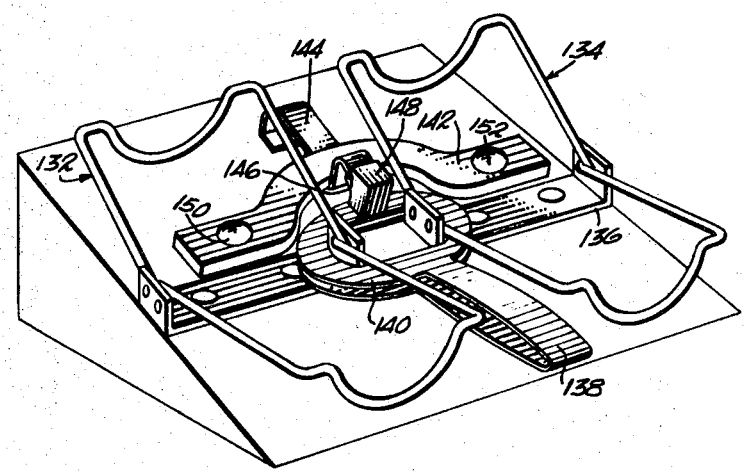
INVENTOR.
RUBEN C. LITTLE
BY John Cyril Malloy
ATTORNEY.

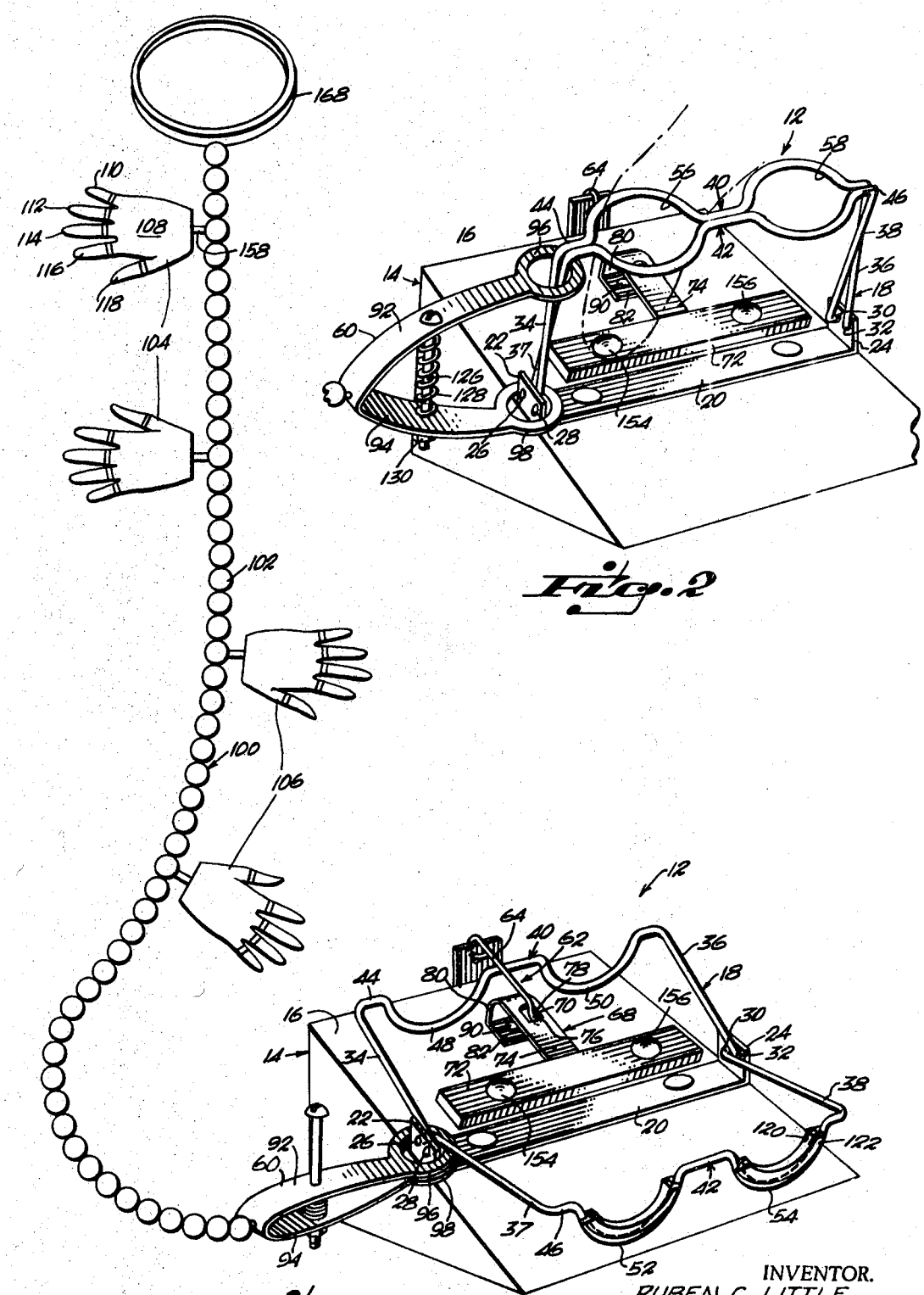

United States Patent Office 3,559,302
Patented Feb. 2, 1971

3,559,302
EDUCATIONAL GAME DEVICE TO IMPROVE TYPING SKILL
Ruben C. Little, 7800 SW. 52nd Court, South Miami, Fla. 33134
Filed July 18, 1968, Ser. No. 745,932
Int. Cl. G09b 13/00; A01m 23/24; A63b 67/00
U.S. Cl. 35—5                                              10 Claims

ABSTRACT OF THE DISCLOSURE

An educational game device which includes a gripping jaw type trap assembly with spring means to normally close the jaws and detent means to hold the jaws open against the bias of a spring which includes trip means to trip the detent means in bringing the jaws together under the urging of the spring, the jaws having a finger receiving opening for access to the trip means through which players extend their fingers to trip the mechanism and close the jaws.

---

As is perhaps well known, typing is a skill which requires co-ordination between the mind and the fingertips and as a preliminary requires an intimate knowledge and appreciation of the fingers which correspond to the location of various keys on a standard typewriter keyboard and, additionally, the precise finger which is to be used in a preferred typing operation and the letters or symbols most conveniently reached by each typing finger. This invention comprises an educational toy for the purpose of developing the skills and co-ordination required by a rapid typist and to teach students the correct fingers to be used to strike the keys at their respective locations on a standard typewriter keyboard.

It is, accordingly, an object of this invention to provide an educational device for use in teaching the fingers to be used in typing particular letters which includes a pair of gripping jaw-type members of a trap assembly to be actuated on simulated striking of a key and depression of the same, the said jaw members being arranged to slap the fingers of the user when the technique employed is not in accordance with the best typing techniques.

It is another object of this invention to provide an improved, inexpensive teaching device for use in training typing students which is simple in construction, inexpensive to manufacture, and is adapted for amusing variations of game type activity for pleasurable learning by students of otherwise dull and uninteresting associations of the location of letters on a keyboard in relation to the fingers of a hand, which must be mastered before one may become a good typist.

It is another object of this invention to provide an amusement device with a novel construction and scoring means for maintaining a running record between two opponents using the device as to the relative level of their knowledge and the fingers of the players which have been trained to respond more rapidly to the keyboard indicia of a typewriter.

In accordance with these and other objects which will become apparent hereinafter, the instant invention will now be described with reference to the accompanying drawings in which:

FIG. 1 is a perspective view of an educational game device constructed for use in accordance with this invention;

FIG. 2 is a view similar to FIG. 1 and illustrating an embodiment of the instant invention with the jaws of the device in a closed position;

FIG. 3 and FIG. 4 are enlarged views of portions of the corresponding portions of FIG. 1 and illustrating the construction of the simulated hands and fingers; and FIG. 5 is an alternative embodiment of the device seen in FIG. 2.

Referring to the drawings, wherein like reference characters designate like or corresponding parts throughout the different views, the structure of the educational game device will be described following which the operation thereof will be discussed. The device is generally designated by the numeral 12 and includes a foundation 14 preferably including an upper inclined surface 16 supporting a gripping jaw type trap assembly 18. The trap assembly includes a spring base 20 with opposed upstanding ears 22 and 24 which are apertured to receive pintles 26 and 28 and 30 and 32 on the proximal end of opposed arms 34 and 36 and 37 and 38 of the jaw members 40 and 42. The bite length 44 and 46 or the abutting surfaces of the jaw members are each provided with a pair of recessed lips, such as 48 and 50 and 52 and 54, which are compionately configured to define a mouth opening such as that indicated by the numerals 56 and 58 in FIG. 2. Spring means 60 are provided to normally urge te jaws together and yieldable in response to pivotal movement of the bail type jaws with respect to their pintle connection to the ears to an open position indicated in FIG. 1. Detent means 62 are provided to hold the jaws in an open position, said detent means including a tongue 64 movably secured to the foundation on one side of the catch of the trap assembly outwardly of the throw of the bite portion of the jaws. A trigger mechanism 68 is provided to hold the terminal end 70 of the detent tongue across the bite portion of one of the jaws to hold it in an open position against the bias of the spring 60. The trigger mechanism includes a platform 72 which floats on the cantilever type yieldable spring steel member 74 so as to be adapted to be depressed and in so doing release the end 70 of the tongue 64, the tip of which is captivated under the marginal edge 76 of an opening 78 arranged above an upstanding support 80 and foot 82, the latter being secured to the foundation by suitable means such as the nail or rivet 90. The spring means is preferably of the reversely bent leaf spring type including arms 92 and 94 on the terminal ends of which ring portions 96 and 98 are provided which are circumposed about one of the ears of the base 20 when compressed and dwell beneath plane defined by pintles so long as retained in that position by the detent means. Extending outwardly of the trap assembly an elongate scoring means 100 is provided which preferably includes a flexible chain 102 and a first and a second pair of simulated hands 104 and 106. Each of the simulated hands includes a palm portion 108 and finger portions 110, 112, 114, 116 and 118. Each of the finger portions bears indicia corresponding to the portion of a typewriter which the finger of the simulated hand would strike if one were typing with a finger on a typewriter. For instance, the left forefinger includes the letters F and R which on a customary typewriter are keys to be struck by that finger. In the case of special typewriter equipment, other equipment may be located on the corresponding distal end portions of the fingers.

In operation, the object of the game is a contest between two people to see if they can get their fingers out of the set trap before the jaws of the trap catch or bite them when it is sprung. The hands act as a scoreboard, 106, 108. In playing the game, in contrast to the purpose of an animal trap, the object is to avoid being caught or bit by the jaw action. The players attempt to touch the trigger or keyboard with the tips of their actual fingers before their opponent does and may also attempt to remove the tripping finger without getting hit or caught by the jaws of the spring trap. Two persons play the game, for instance, by selecting one of the two players to be the trigger man. The trap is then set. The trigger man starts the game by using his left forefinger while his opponent uses the right forefinger. Both players try to insert their fingers at the proper angle so that when the trigger man touches or throws the trap it will snap shut but won't touch his fingers if they are in the safe position; that is, the precise position within the open mouth most favorably required for positioning of the finger. Player 1 withdraws his finger or player 1 may at any time depress the trigger to spring the trap and try to catch the finger of his opponent if it is not in a correct attitude. Whenever this occurs, the player unscrews the finger facsimile which corresponds to the finger which was caught, leaving only a nub on the simulated hand and gives the terminal end portion of the scorecard finger to his opponent. Score is kept in this manner and the players continue to make thrusts into and out of the trap employing various timing and teaching techniques in simulation of the use of the correct finger in actual typing in competition with one another, increasing their responsiveness and finger dexterity. The game continues until one of the players has accumulated all of the opponent's fingers and thumbs from his corresponding pair of hands on the scoreboard chain. It will be readily apparent that by playing this game even small children rapidly learn the position of the keys on a keyboard and the corresponding fingers required to operate them in a most favorable typing technique. Referring to FIG. 1, for purposes of marking a player's finger for the purpose of keeping score, an insert of chalk material 120 may be provided to line the opposing surfaces of the lips of the mouth, the said chalk material being in semicircular ring form and received in a carrier 122 or being otherwise suitably fastened along the lips. Adjustments means 124 may be provided for adjusting the tension of the spring and, consequently, the force with which the trap shuts, the said adjustment means being of any suitable form such as the vertical member 126 seen in FIG. 2 about which a coil compressed spring 128 is provided and captivated between the arms 92 and 94 with the tension of the coil spring being adapted to be adjusted by threaded manipulation of the member with respect to a bolt 130 secured to one of the arms of the spring. Referring to FIG. 5, it will be seen that an alternative embodiment may be provided comprising dual jaw members 132 and 134, each of which is adapted to be pivotally connected in a similar fashion to that indicated above to a base 136 and operable against a normal jaw closed position and a spring biased jaw open position shown in FIG. 5 in which the spring 138 is compressed and urges the rings 140 circumposed about and beneath the pintle connections of each of the jaws. The trigger and detent mechanisms are similar to that described above, there being provided a common floating trigger bar 142 and a tongue 144 of the detent being adapted to be disconnected to release the spring on depression of the tongue so that the terminal edge 146 disengages the catch 148 on the spring to close the jaws. In the preferred embodiment, a target area, such as 150 and 152 in FIG. 5 and 154 and 156 in FIGS. 1 and 2, are provided to guide the players into a preferred position which simulates the recess of the face of a key, the inclination of the upper surface of the base portion being adapted to simulate the stepped inclined surface of the keyboard. In the preferred embodiment, each of the hands is provided with a stud 158 to connect to one of the balls of the chain 102, the palm portion 108 of which includes the aforesaid fingers and means to connect the proximal end of each comprising a threaded end 164 adapted to be received in a socket 166 in the end thereof for threaded connection therewith. A hanging ring 168 is provided for the device to store and display it.

While the instant invention has been shown and described herein in what is conceived to be the most practical and preferred embodiment, it is recognized that departures may be made therefrom within the scope of the invention, which is, therefore, not to be limited to the details disclosed herein but is to be accorded the full scope of the claims so as to embrace any and all equivalent apparatus and articles.

What is claimed is:

1. An educational game device comprising, a foundation, and a gripping jaw type trap assembly secured on the foundation and including (a) a pair of opposed jaws, (b) a spring base, (c) pivot means to connect the jaws to the base, (d) spring means to urge the jaws together in biting relation, (e) detent means to hold the jaws open against the bias of the spring, (f) trip means including a platform with a defined target to trip the detent means and bring the jaws together under the urging of said spring, (g) the bite portion of each of said jaws including a recess lip sized to define a pair of mouth openings when the jaws are closed with said target lying beneath both of said openings, (h) each of said mouths being sized to receive the distal end of a finger extending through said mouth to the trip means.

2. The device as set forth in claim 1 wherein scoring means are provided comprising, a chain connected to said device and two pairs of simulated hands are connected on the chain, each of said hands including a palm portion and removable finger portions and indicia on the portions, whereby the device may be used for developing typing skills and scores maintained by assigning a pair of hands to a player for removing the distal end portions of the fingers from the proximal ends to keep score.

3. The device as set forth in claim 1 wherein marker means are carried on said lips to mark a player's finger projecting through one of the mouth openings if not substantially aligned with the centerline perpendicular to the plane of the openings.

4. The device as set forth in claim 3 wherein the marker means comprises a carrier on the leading edge of the lips and a supply of chalk in the carrier to mark a finger that is not spaced from the lips of the mouth opening and in the trap extending toward the trigger mechanism.

5. The device as set forth in claim 1 wherein adjustment means are provided to adjust the spring bias of the spring means to regulate the force with which the jaws close.

6. The device as set forth in claim 1 wherein said foundation is inclined with respect to horizontal to effect the simulated inclination of the keyboard of a typewriter.

7. The device as set forth in claim 1 wherein a simulated typewriter key recess is provided in the platforms confronting said openings when the jaws are closed to simulate the recess of a typewriter key.

8. The device as set forth in claim 2 wherein each of said fingers is threadably connected to the palm portion defining in combination a hand replica.

9. The device as set forth in claim 1 wherein said trap assembly includes a first and a second pair of opposed jaws.

10. The device as set forth in claim 9 wherein means are provided to adjust the spring bias of said spring means to regulate the force with which the jaws close.

References Cited

UNITED STATES PATENTS

| | | | |
|---|---|---|---|
| 1,316,024 | 9/1919 | Froelich | 43—90 |
| 1,527,891 | 2/1925 | Lovelace | 43—90 |
| 2,570,908 | 10/1951 | Behr | 35—5 |

FOREIGN PATENTS

| | | |
|---|---|---|
| 130,894 | 1/1949 | Australia. |
| 295,723 | 5/1929 | Great Britain. |

WILLIAM H. GRIEB, Primary Examiner

U.S. Cl. X.R.

43—90; 273—1